No. 789,864. PATENTED MAY 16, 1905.
W. F. MAINS.
MUSIC LEAF TURNER.
APPLICATION FILED JAN. 31, 1905.
2 SHEETS—SHEET 1.
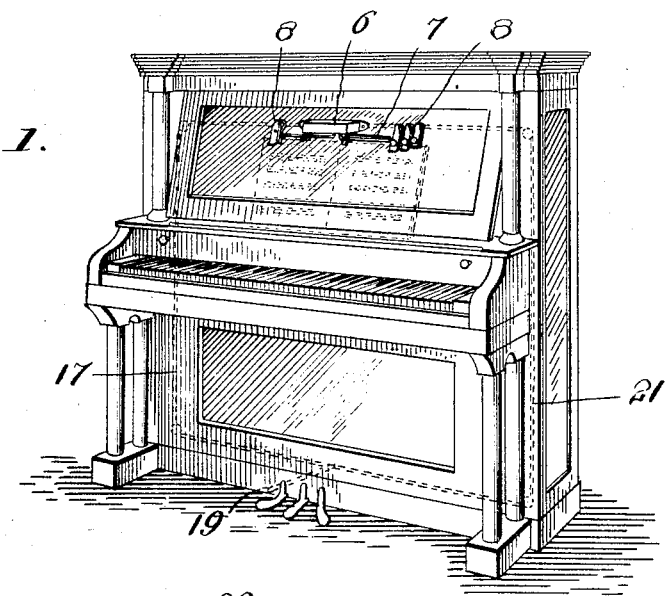
Fig. 1.
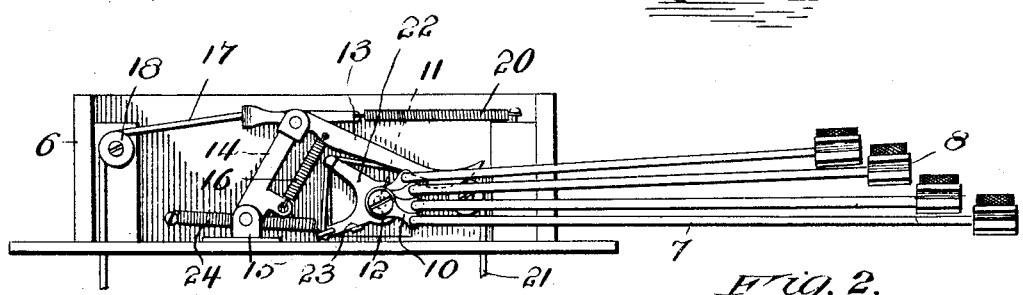
Fig. 2.
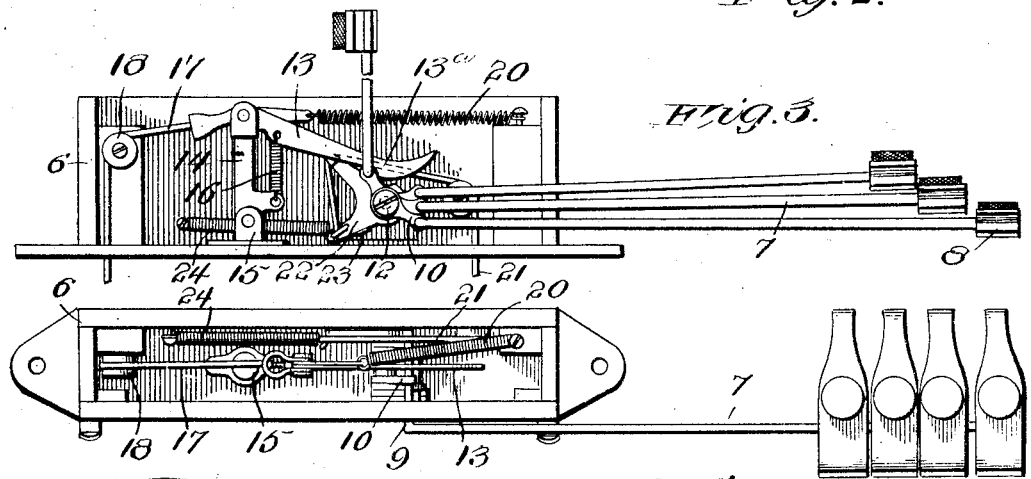
Fig. 3.
Fig. 4.
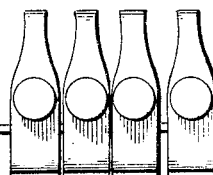
WITNESSES:
W. F. Koyle
Geo. E. Few
INVENTOR
William F. Mains,
By
Milo B. Stevens & Co.
Attorneys No. 789,864. PATENTED MAY 16, 1905.
W. F. MAINS.
MUSIC LEAF TURNER.
APPLICATION FILED JAN. 31, 1905.
2 SHEETS—SHEET 2.
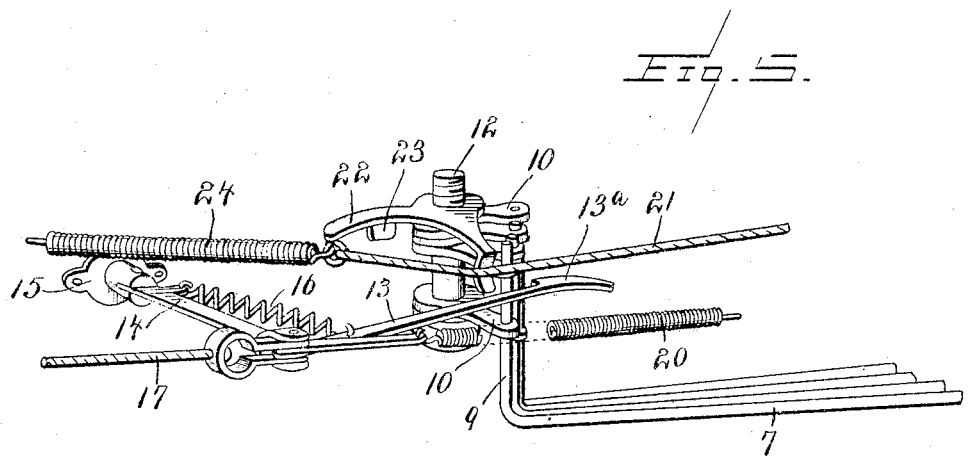
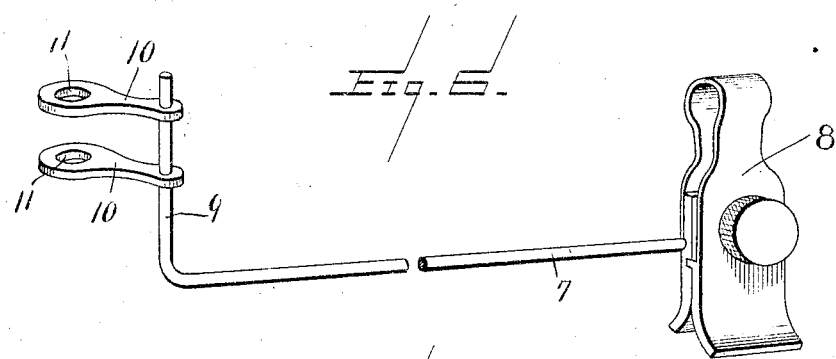
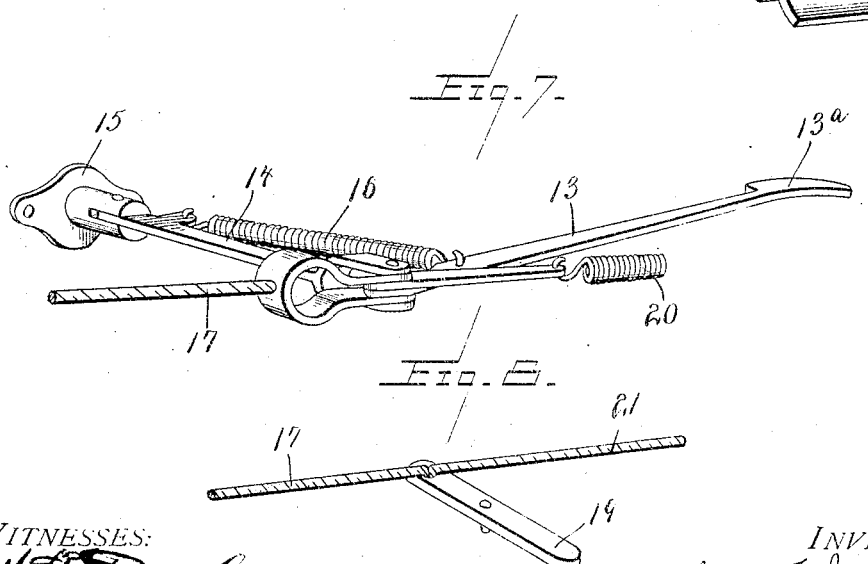
WITNESSES:
INVENTOR
William F. Mains,
BY
Milo B. Stevens & Co.
Attorneys No. 789,864. Patented May 16, 1905.

UNITED STATES PATENT OFFICE.

WILLIAM F. MAINS, OF CLEVELAND, OHIO.

MUSIC-LEAF TURNER.

SPECIFICATION forming part of Letters Patent No. 789,864, dated May 16, 1905.

Application filed January 31, 1905. Serial No. 243,461.

*To all whom it may concern:*

Be it known that I, WILLIAM F. MAINS, a citizen of the United States, residing at Cleveland, in the county of Cuyahoga and State of Ohio, have invented new and useful Improvements in Music-Leaf Turners, of which the following is a specification.

This invention is a music-leaf turner designed particularly for attachment to pianos and organs, although capable of use independently of said instruments.

The object of the invention is to produce an improved device of the kind, as will more fully appear from the following description and claims and the accompanying drawings.

In the drawings, Figure 1 is a perspective view of the device applied to a piano, cord connections to a pedal for operating the device being indicated in dotted lines. Fig. 2 is a bottom plan view of the device with the bottom of the casing removed. Fig. 3 is a similar view with one of the leaf-turning arms in the act of being thrown over to the left. Fig. 4 is a front view, part of the casing being removed. Fig. 5 is a perspective view showing the devices for turning the arms back and forth. Fig. 6 is a perspective view of one of the arms detached. Fig. 7 is a perspective view of the pallet and its connections detached. Fig. 8 is a perspective view of the pedal to which the cords are connected.

Referring specifically to the drawings, the leaf-turning devices are contained in and upon a casing 6, which may be mounted on the front board of the piano, as indicated in Fig. 1.

7 indicates swinging arms which have clips 8 at their outer ends to engage the upper edges of the leaves and at their inner ends are bent up, as at 9, and rigidly connected to upper and lower spaced pieces 10, which have holes 11, through which the pivot-pin 12 fits. The spaces between the pieces 10 vary, so that the pieces of one arm fit between those of the other arms, so that all the pieces are mounted on a single pivot and the arms may be swung around one by one. This swinging action to turn the arms and leaves to the left is effected by a pallet 13, pivotally carried at one end of a lever 14, the other end of which is pivoted to a bracket 15 on the back piece of the casing. A spring 16, connected between the lever and the pallet, holds the pallet in engagement with the arms. The hook 13ª of the pallet takes behind the portion 9 of the arm and is of proper depth to engage one and only one of such arms.

17 indicates a cord connected to the lever 14 for pulling the pallet to the left. This cord extends around a pulley 18 in the casing and thence may be carried around suitable guide-pulleys in the casing of the piano to connection with the pedal 19. A spring 20, connected to the lever 14, returns the pallet after the cord 17 is released.

To return the arms and leaves to their original position at the right, a cord 21 is employed, extending oppositely through the piano-casing to connection with the pedal 19. This cord is connected at its end to a bell-crank lever 22, which is pivoted on the pin 12. This lever has a downwardly-projecting lug 23, against which the upper pieces 10 of the arms stop when they are thrown to the left. In this position a pull on the cord 21 turns the bell-crank lever around the pivot 12 to the right, and the lug 23 carries ahead of it the swinging arms, throwing them back to the original position. A spring 24, connected to the bell-crank lever, acts to pull the same back when the cord 21 is released. The pedal 19 is so pivoted that when moved by the foot in one direction it pulls one cord and when moved in the other direction it pulls the other cord.

What I claim as new, and desire to secure by Letters Patent, is—

1. In a leaf-turner, in combination, a series of swinging arms having portions near their pivoted ends extending parallel to the pivotal axis, a lever pivoted at one end to swing transversely with respect to said axis, a hooked pallet pivoted to the other end of the lever and movable across said portions, and means connected to the lever to swing the same.

2. In a leaf-turner, in combination, a series of swinging arms, a lever, a pallet pivoted thereto and having a hook arranged to engage and pull said arms in one direction, a spring connected between the lever and pallet, a lever against which the arms stop, movable to turn the same back, and operating-cords connected to said levers respectively.

In testimony whereof I have signed my name to this specification in the presence of two subscribing witnesses.

WILLIAM F. MAINS.

Witnesses:
    JOHN A. BOMMHARDT,
    CATHERINE BOMMHARDT.